Jan. 14, 1964     H. D. FAHRENHOLZ     3,117,631
ROCK WINDROWER
Filed Feb. 2, 1962                                         2 Sheets-Sheet 1
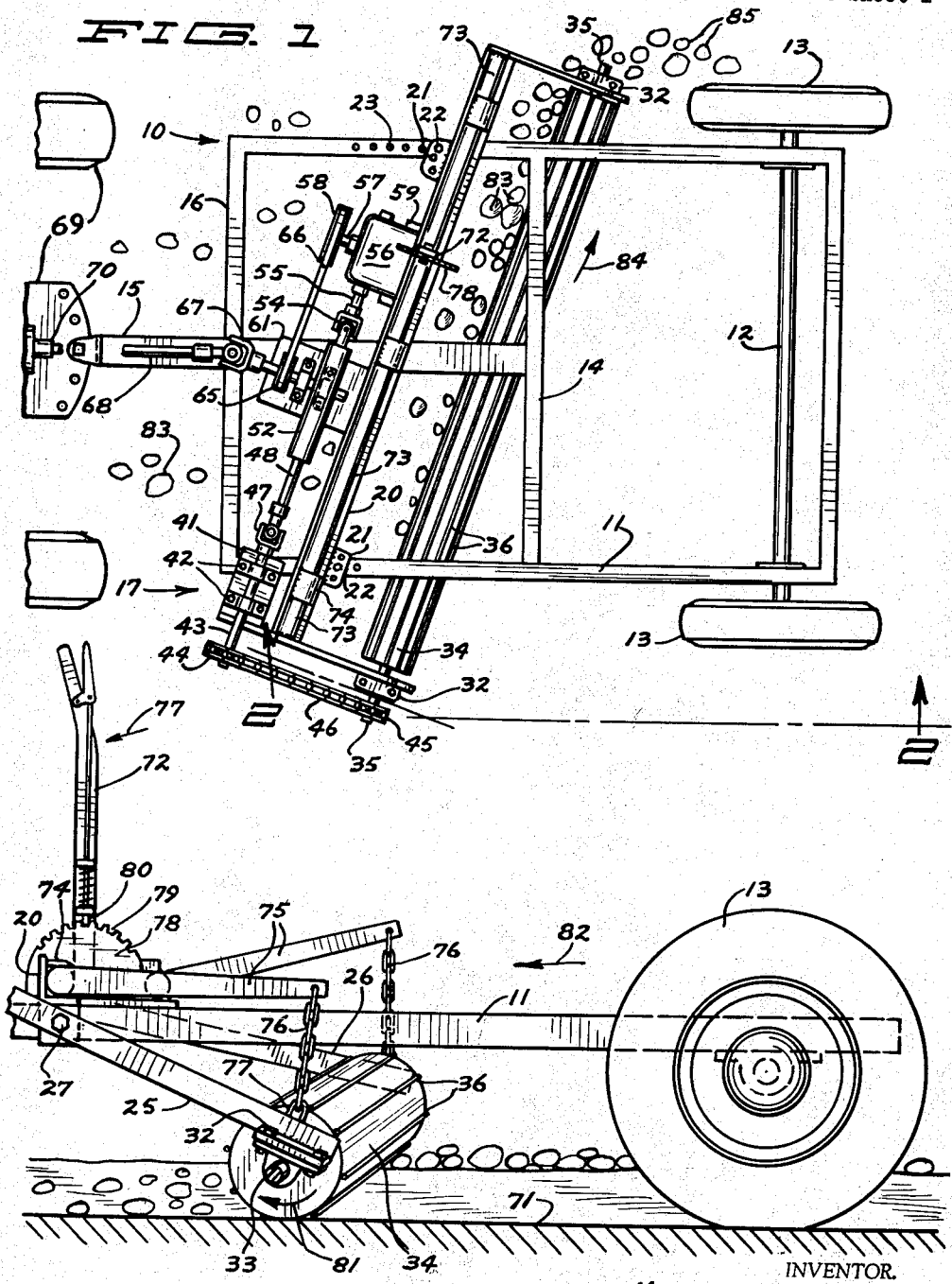
INVENTOR.
HARLEY D. FAHRENHOLZ
BY
Braddock and Braddock
ATTORNEYS

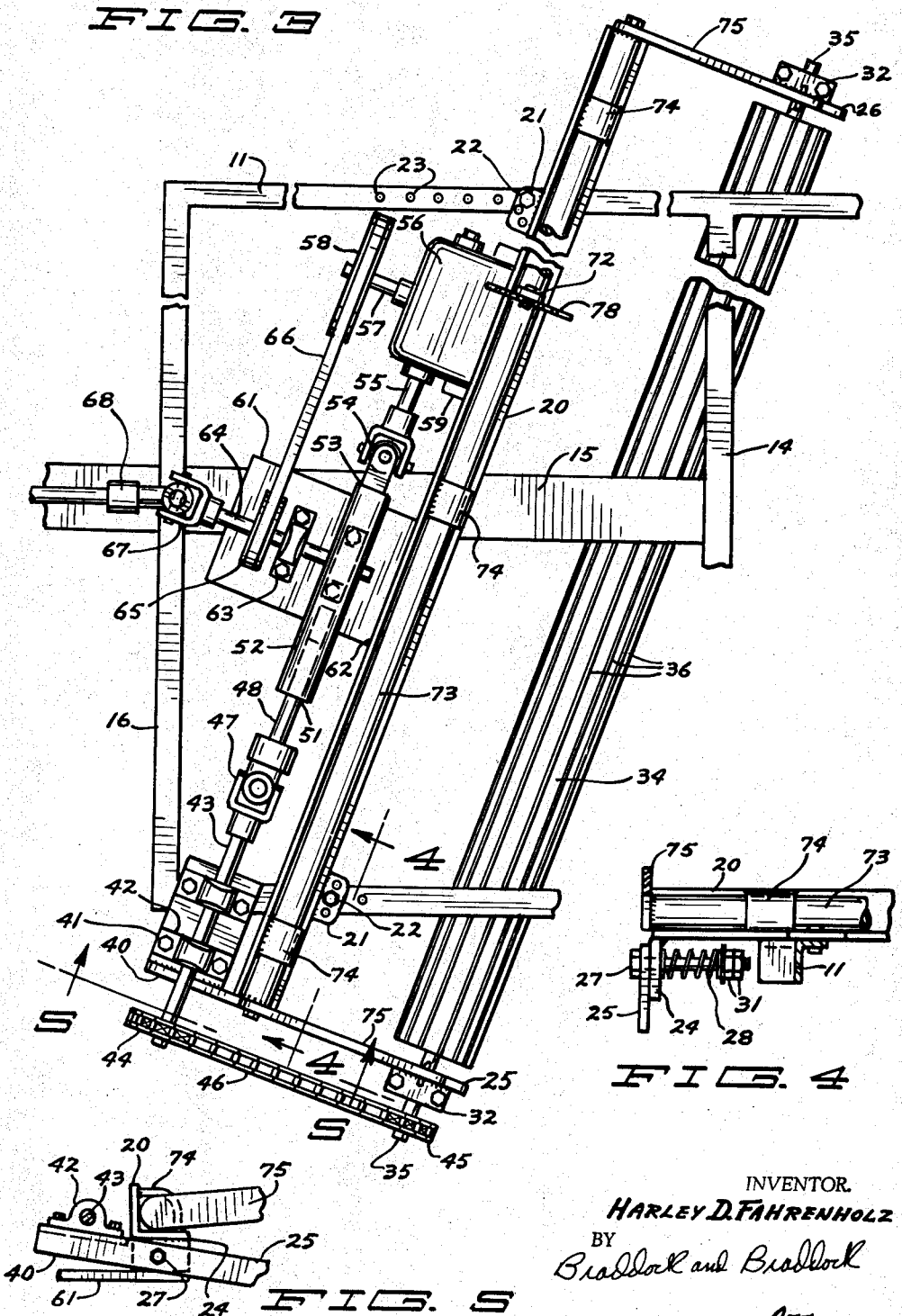

United States Patent Office 3,117,631
Patented Jan. 14, 1964

3,117,631
ROCK WINDROWER
Harley D. Fahrenholz, Eagle Bend, Minn.
(Box 81, Clarissa, Minn.)
Filed Feb. 2, 1962, Ser. No. 170,566
2 Claims. (Cl. 171—63)

The present invention has relation to a rock windrower which can be used to move rocks from position dispersed across the surface of the ground into a windrow from which they can be easily picked up by a rock picking machine.

In certain sections of our country it is necessary, in order to prevent damage to equipment, to remove rocks from the surface of farmers' fields, either by hand or through the use of machines. Some rock picking machines are satisfactory where the rocks are very close together but become uneconomical where the rocks are relatively sparse. Thus, where the rocks are sparse, the farmer will either have to pick them by hand or leave them in the field. Rocks in the field cause a great deal of damage to machinery and are very undesirable.

The present invention presents a rock windrower which will move rocks in its path into a windrow as it travels over the ground. The windrower thus can be used to move the rocks from a large area into one row so that a mechanical picker can be employed to pick the rocks up economically or the rock can be more quickly picked by hand if desired. The rock windrower is lighter, less expensive, and will cover more ground than a picker so that the job of windrowing goes very rapidly.

The device utilizes a rotating roller which is mounted on a frame and positioned at an angle other than 90 degrees with respect to the direction of travel of the roller. As the roller moves along the ground the rocks will move transversely with respect to the direction of travel and will be left in a windrow aligned with one end of the roller.

The roller can be any desired length in order to cover a wide swath with each pass of the machine, or, if desired, two rollers can be hooked together end to end to increase the width of the machine.

It is an object of the present invention to present a low cost, unique and highly efficient rock windrower.

In the drawings,

FIG. 1 is a top plan view of a rock windrower made according to the present invention;

FIG. 2 is an enlarged view taken as on line 2—2 in FIG. 1 with parts in sections and parts broken away;

FIG. 3 is a fragmentary enlarged top plan view of a portion of the device of FIG. 1;

FIG. 4 is a fragmentary view taken as on line 4—4 in FIG. 3 with parts in section and parts broken away; and FIG. 5 is a fragmentary side elevational view taken as on line 5—5 in FIG. 3, with parts in section and parts broken away.

Referring to the drawings and numerals of reference thereon, a rock windrower 10 includes a main box-type frame 11 that is supported by an axle 12 on which a pair of ground engaging wheels 13, 13 are rotatably mounted. A center cross member 14 of the frame 11 supports a pole 15 by which the rock windrower is drawn over the ground. The pole 15 is also fixedly attached to a front cross member 16 of the frame 11.

A roller and drive unit 17 is bolted to the frame 11 and is removable therefrom, if desired. The roller and drive assembly includes a main cross member 20 that has a pair of fixedly attached ears 21, 21 which are provided with holes and through which a bolt extends to join the main cross member to the side members of frame 11, as at 22. A plurality of adjustment holes 23 are provided in one of the side members of frame 11 so that the angle of the main cross member 20 with respect to the longitudinal axis of the frame 11 can be changed.

As perhaps best seen in FIG. 4, a block 24 is fixedly attached to a bottom surface of cross member 20 adjacent each end thereof. Each block 24 is provided with a hole therethrough. A lefthand support arm 25 and a righthand support arm 26 are each pivotally mounted to their respective block 24, each with a separate bolt 27. The bolts 27, 27 extend through their respective support arms and through the provided holes in blocks 24. A separate spring 28 is positioned over each of the bolts 27 and is locked in place with a pair of lock nuts 31, 31 on each of the bolts. Each of the springs 28 urges its respective support arm against its associated block 24.

A separate bearing plate 32 is fixedly attached to each of the support arms adjacent a rearward end thereof and a bearing 33 is mounted on each of the plates. A tubular roller assembly 34 has a pair of integral end shafts 35, 35 which are mounted in bearings 33, 33. The roller assembly is positioned between the support arms 25, 26. The roller 34 has a plurality of integral longitudinally extending ribs 36 regularly spaced around the outer periphery thereof. The ribs can be of any desired cross section or configuration.

The left hand support arm 25 has a forwardly extending portion 40 which projects forwardly from its pivot bolt 27. The forwardly extending portion 40 also extends beyond the main cross member 20. A second support plate 41 is fixedly attached to the forwardly extending portion 40 of support arm 25. The surface of support plate 41 is substantially parallel to the axis of rotation of roller 34. A pair of pillow block bearings 42, 42 are mounted on support plate 41. A shaft 43 is rotatably mounted in the bearings 42, 42. The shaft 43 also extends substantially parallel to the axis of rotation of roller 34. A first sprocket 44 is drivably mounted on an outwardly extending end portion of shaft 43 and a second driven sprocket 45 is drivably mounted on the left hand shaft 35 of roller 34. A roller chain 46 drivably connects the sprockets 44 and 45.

A universal or U joint assembly 47 having an integral shaft 48 is drivably mounted on the opposite end of shaft 43 from sprocket 44. Shaft 48 of the universal joint assembly is slidably drivably mounted, as at 51, in a tubular shaft 52, which in turn is drivably mounted as at 53 to a second universal joint assembly 54. The second universal joint is further drivably connected to an output shaft 55 of a gear box 56. An input shaft 57 also extends from the gear box 56 and a driven V-belt pulley 58 is drivably mounted on the input shaft. Gear box 56 is mounted on a bracket 59 that is fixedly attached to cross member 20.

A main drive shaft mounting plate 61 is fixedly attached as at 62 to main cross member 20 and extends forwardly therefrom. A pair of pillow block bearings 63, 63 are mounted on the drive shaft mounting plate 61 and a drive shaft 64 is rotatably mounted in the pillow block bearings. A drive pulley 65 is drivably mounted to drive shaft 64 adjacent a first end thereof and a V-belt 66 extends from pulley 65 to driven pulley 58. A universal joint 67 is drivably mounted to main drive shaft 64 forwardly from pulley 65. A power take-off drive shaft assembly 68 is drivably connected to universal joint 67. The power take-off drive shaft is, when the unit is to be used, connected to the power take-off or powered rotatable output shaft 70 of a tractor or prime mover 69 and receives its power therefrom.

The roller 34 is positioned below the frame 11 and engages the ground, represented at 71, as the rock windrower is pulled over the field. When the unit is being transported or not being used the roller can be raised by actuating of a lever 72 which is fixedly attached to a torque tube 73 which in turn is rotatably mounted with respect to main mounting angle 20. The torque tube 73 is kept in place with straps or bearings 74 which rotatably support it. A pair of lift arms 75, 75 are integral with the torque tube at opposite ends thereof and extend rearwardly substantially vertically alined with the roller support arms 25, 26. A separate link chain 76 is connected to each of the lift arms 75 adjacent the rear end portions thereof and each of the chains extends downwardly and is fixedly attached as at 77 to its associated roller support arm.

Thus when the roller 34 is to be raised the lever 72 is moved in direction as indicated by arrow 77, which in turn will bring lift arms 75, 75 upwardly and thus lift the support arms 25, 26 and the roller 34.

The lever 72 operates through a lever quadrant 78 which is fixedly attached to the main angle iron member 20. The quadrant 78 has notches 79 into which the lever dog 80 will drop to hold the lever into position with the roller 34 off the ground.

During normal operation the chains 76, 76 will be kept slack so that the roller 34 will ride along the ground and be free to move with the contours thereof.

*Operation* is connected to a tractor or prime mover 69 having a powered rotatable output shaft 70 and the power take-off drive shaft 68 is connected to the powered output shaft of the tractor. The lever 72 is moved so that roller 34 is engaging the ground and chains 76, 76 are slack. The powered output shaft of the tractor is then started and it will rotate and drive power take-off drive shaft 68. This in turn will drive main drive shaft 64 which will drive input shaft 57 of gear box 56 through the provided pulleys and belt, 65, 58 and 66. The gear box output shaft 55 will rotate under this force and will turn shaft 43 through the slidable drive shaft assembly extending between the gear box and the shaft 43. The shaft 43 in turn will drive sprocket 44 which will thus drive roller shaft 35 and roller 34 through chain 46 and sprocket 45. The roller 34 will rotate in direction as indicated by arrow 81 in FIG. 2 and the rock windrower will be pulled forward in direction as indicated by arrow 82 in FIG. 2.

As the unit moves forwardly over the ground 71, rocks, represented at 83, will be engaged by the roller 34 and ribs 36 on roller 34. The roller 34, which is situated at an angle other than 90 degrees with respect to the direction of travel, will move the rocks 83 across the length of the roller in direction as indicated by arrows 84 in FIG. 1. When the rocks reach the rearwardly extending end of the roller, they will be left on the ground in a windrow 85. The windrow 85 will fall outside of the path of wheel 13 and will be left in the field so that the rocks can be picked up by mechanical picker.

The roller 34 will "float" along the ground and will follow the contours in order to move all of the rocks in its path into a windrower 85. In following the normal contours of the ground, the opposite ends of the roller 34 will move up and down independently. This will not affect the roller drive train as the shaft 43 and its supporting members will move along with support arm 25. The change in shaft length between gear box 56 and universal joint 47 will be compensated for by the sliding assembly between shaft 48 and tubular shaft 52.

As one end of the roller may move upwardly or downwardly more than the other, the arms 25, 26 may cock slightly with respect to their support blocks 24. Springs 28 mounted on bolts 27 will permit the support arms 25, 26 to cock slightly and yet will hold them normally contiguous to the blocks.

Also it should be noted that the bearings 33 for the roller shafts 35 are self-alining and will not be damaged by unequal movement between the ends of the rollers.

As stated previously the main mounting member 20 can be moved to any desired angle with respect to the direction of travel in order to accommodate existing conditions in the field where the rocks are being picked. Also the main mounting member 20 can be completely removed from the machine by simply removing two bolts and the windrower frame can be used for other purposes if desired. The drive train and the roller will be removed along with the main mounting angle member 20.

It is apparent that a machine made according to the present invention may accomplish many other results besides windrowing rocks. For example, it can be used for smoothing the ground surface and removing or breaking up clods of dirt. It will thus find many uses in landscaping and grading tasks.

The earth's surface is left smooth after the machine has passed over it. This aids in preparing a good seed bed. Thus the machine accomplishes many results.

What is claimed is:

1. A machine for forming windrows of discrete pieces of material dispersed on a supporting surface said machine including:
   a frame,
   support means for maintaining said frame in spaced relation to said supporting surface, said frame being adapted to be moved along said supporting surface,
   a main support member attached with respect to said frame and extending in substantially transverse direction with respect to the direction of movement of said frame,
   a pair of support arms pivotally mounted with respect to said main support member at opposite ends thereof, said support arms being positioned outwardly from side edges of said frame,
   a roller having a plurality of integral, longitudinally extending ribs spaced around the outer periphery thereof rotatably mounted with respect to said support arms and extending therebetween, the longitudinal axis of said roller extending substantially parallel to said main support member,
   a prime mover having a power driven rotatable output shaft and being connected to said frame in position to move said frame along said supporting surface, and
   drive means connecting said roller to said power shaft of said prime mover, said roller thereby being rotatable as said machine is moved along said supporting surface by said prime mover.

2. The combination as specified in claim 1 and releasable means capable of holding said roller in spaced relationship with said supporting surface.

References Cited in the file of this patent

UNITED STATES PATENTS

| | | |
|---|---|---|
| 2,938,586 | Gaffney | May 31, 1960 |
| 2,971,587 | Anderson | Feb. 14, 1961 |

UNITED STATES PATENT OFFICE
CERTIFICATE OF CORRECTION

Patent No. 3,117,631　　　　　　　　　　　　　　　January 14, 1964

Harley D. Fahrenholz

It is hereby certified that error appears in the above numbered patent requiring correction and that the said Letters Patent should read as corrected below.

Column 3, line 26, before "is" insert --- When the rock windrower is to be used, the pole 15 ---.

Signed and sealed this 16th day of June 1964.

(SEAL)
Attest:

ERNEST W. SWIDER　　　　　　　　　　　　　　　EDWARD J. BRENNER
Attesting Officer　　　　　　　　　　　　　　　　Commissioner of Patents